United States Patent [19]

Collier

[11] E Patent Number: Re. 33,220

[45] Reissued Date of Patent: May 22, 1990

[54] MODULAR COMBINATION FLOOR SUPPORT AND ELECTRICAL ISOLATION SYSTEM FOR USE IN BUILDING STRUCTURES

[75] Inventor: William R. Collier, Oak Brook Terrace, Ill.

[73] Assignee: Interstitial Systems, Inc., Oakbrook, Ill.

[21] Appl. No.: 289,615

[22] Filed: Dec. 23, 1988

Related U.S. Patent Documents

Reissue of:

[64] Patent No.: 4,630,417
Issued: Dec. 23, 1986
Appl. No.: 579,426
Filed: Feb. 13, 1984

[51] Int. Cl.[5] ..... E04B 2/82

[52] U.S. Cl. ..... 52/263; 52/126.4; 52/221; 52/741; 174/48

[58] Field of Search ..... 52/126.1, 126.2, 126.3, 52/126.4, 126.5, 126.6, 126.7, 220, 221, 263, 741; 174/48

[56] References Cited

U.S. PATENT DOCUMENTS

| | | | |
|---|---|---|---|
| 1,678,971 | 7/1928 | Bergesen . | |
| 1,900,812 | 3/1933 | Henkensiefken . | |
| 1,928,797 | 10/1933 | Skar . | |
| 1,996,641 | 4/1935 | Coleman . | |
| 2,278,822 | 4/1942 | Benz . | |
| 2,309,451 | 1/1943 | Hasenburger et al. | 52/126.6 |
| 2,449,292 | 9/1948 | Gillett et al. . | |
| 2,867,301 | 1/1959 | Benton . | |
| 2,904,991 | 9/1959 | Vaughan et al. . | |
| 3,025,934 | 3/1962 | Spiselman et al. . | |
| 3,251,163 | 5/1966 | Russell . | |
| 3,252,400 | 5/1966 | Madl . | |
| 3,316,680 | 5/1967 | Chrastek . | |
| 3,363,375 | 1/1968 | Payne . | |
| 3,503,166 | 3/1970 | Nakazawa et al. . | |
| 3,516,347 | 6/1970 | May . | |
| 3,562,978 | 2/1971 | Ali-Oglu . | |
| 3,604,165 | 9/1971 | Naillon . | |

(List continued on next page.)

OTHER PUBLICATIONS

C-Tec Brochure.
"Schal" Reference Material-dated 1983(?) (Bates Nos. PP007595-PP007620).
"Schal" Private Report-dated 1983(?) (Bates Nos. PP07578-PP007594).
"MERO" Publication-dated 1978(?) (Bates Nos. 000597-000616).
Article: "PLEC: The Explosion In Floor Delivery Capability," Brown, Daniel C. Building Design & Construction Magazine, Oct., 1982.
Correspondence; Drawings, G. H. Montage.
Article: "In-Floor Electrification Systems for Concrete and Steel Framing," MAC-FAB Products, Inc. Co. of St. Louis, Missouri Product Catalog/C 1980.
Article: "Double Plenum Distribution Systems" May, D. H., Magazine and data presently unknown.
Color Photo ("CP-1")-Shows Installation of Wisconsin Bell Telephone Company; Milwaukee, Wis. area.
Color Photo (CP-1)-Wisconsin Bell Telephone Co.

*Primary Examiner*—David A. Scherbel
*Assistant Examiner*—Creighton Smith
*Attorney, Agent, or Firm*—James T. FitzGibbon; Angelo J. Bufalino

[57] ABSTRACT

A floor structure support system comprising a main floor which directly supports one or more computers and one or more additional floors disposed beneath the main floor. The additional floor or floors provide support and mechanical isolation for cables and other electrical conductors, and include sidewalls defining vertical passages to the main floor; one or more of the additional floors may be used as environmental control ducts, with or without sidewalls in addition to those forming the vertical passages. A modular system of support columns, brackets and floor and wall panels is disclosed.

26 Claims, 6 Drawing Sheets

U.S. PATENT DOCUMENTS

| | | | |
|---|---|---|---|
| 3,628,299 | 12/1971 | Nakazawa . | |
| 3,638,404 | 2/1972 | Moll et al. . | |
| 3,640,036 | 2/1972 | Nakazawa et al. . | |
| 3,721,056 | 3/1973 | Toan . | |
| 3,727,362 | 4/1973 | Ellison et al. . | |
| 3,742,666 | 7/1973 | Antoniou . | |
| 3,771,273 | 11/1973 | Brodie . | |
| 3,789,557 | 2/1974 | Harvey . | |
| 3,793,793 | 2/1974 | Dobbins . | |
| 3,827,203 | 8/1974 | Berrie | 52/263 |
| 3,835,614 | 9/1974 | Downing . | |
| 3,852,928 | 12/1974 | Raith . | |
| 3,862,350 | 1/1975 | Milosavich . | |
| 3,893,271 | 7/1975 | Kotlarz . | |
| 3,903,667 | 9/1975 | Zetlin . | |
| 3,921,348 | 11/1975 | Kurzen . | |
| 3,924,370 | 12/1975 | Cauceglia et al. . | |
| 4,016,357 | 4/1977 | Abrahamsen | 174/48 |
| 4,034,526 | 7/1977 | Deslaugiers . | |
| 4,085,557 | 4/1978 | Tharp . | |
| 4,209,660 | 6/1980 | Flachbarth et al. | 174/48 |
| 4,274,458 | 6/1981 | Schwartzkopf | 104/124 |
| 4,296,574 | 10/1981 | Stephens . | |
| 4,450,658 | 5/1984 | Legeai | 52/126.3 |
| 4,465,288 | 8/1984 | Kofoed | 52/221 |
| 4,508,162 | 4/1985 | Radtke . | |

136
200
202
114
112
122
184
162
164
160
150
150
152

FIG. 4
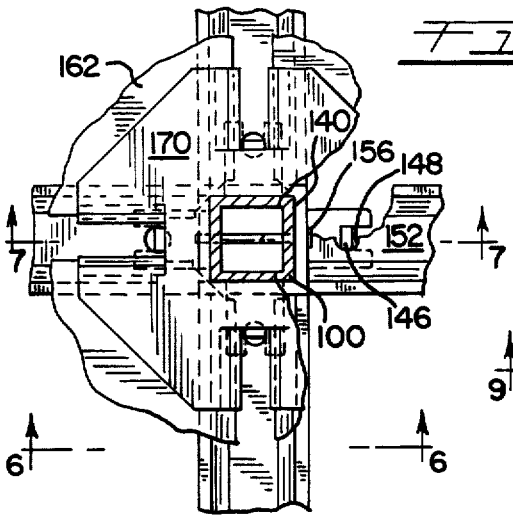
FIG. 5
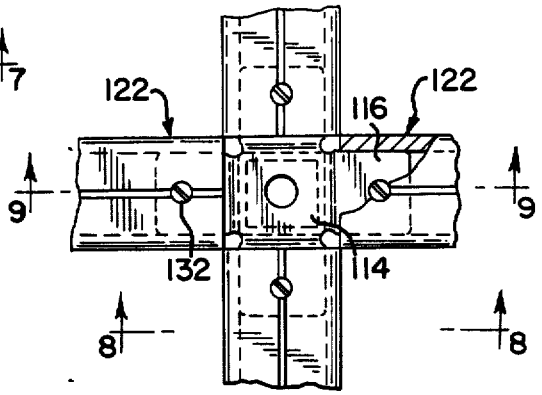
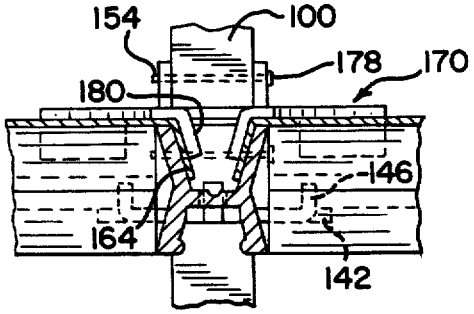
FIG. 6
FIG. 8
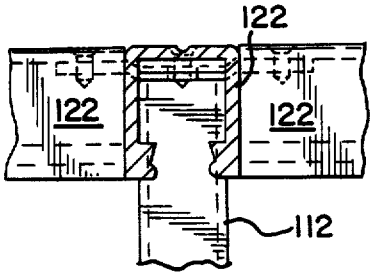
FIG. 7
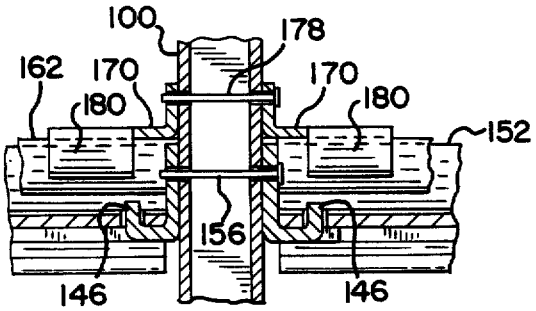
FIG. 9
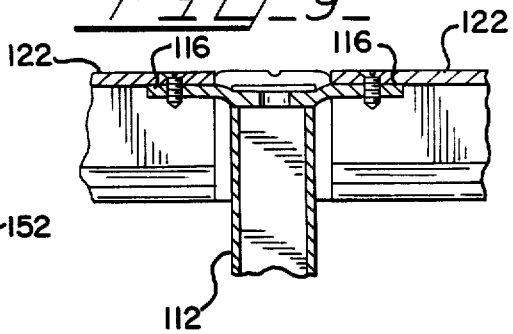

FIG. 13
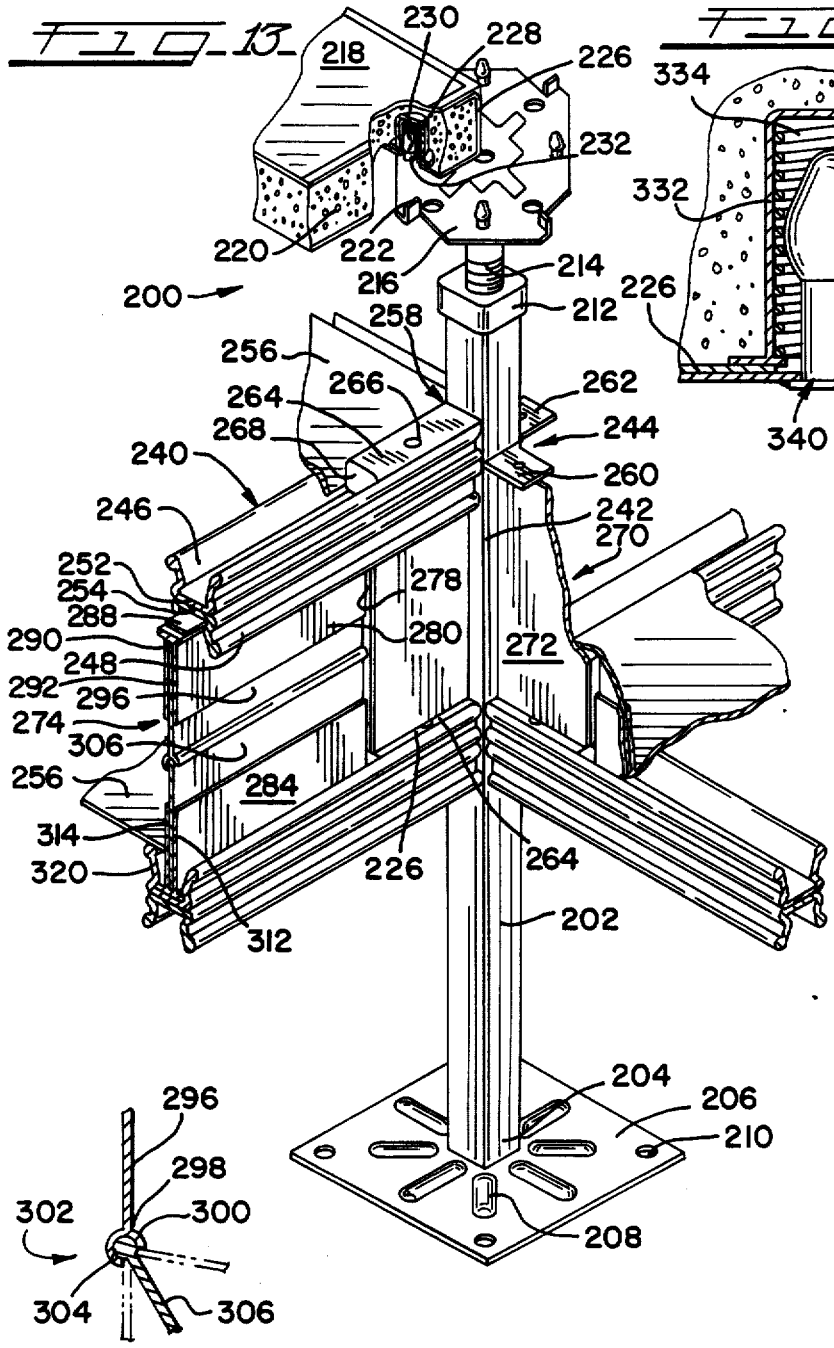
FIG. 14
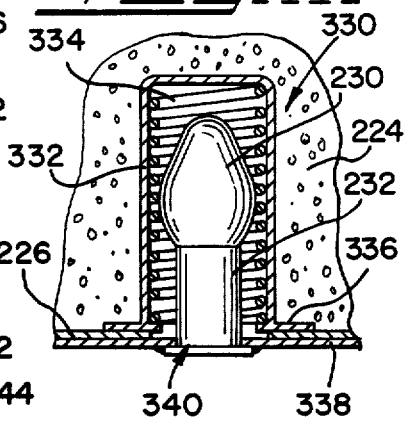
FIG. 15

MODULAR COMBINATION FLOOR SUPPORT AND ELECTRICAL ISOLATION SYSTEM FOR USE IN BUILDING STRUCTURES

Matter enclosed in heavy brackets [ ] appears in the original patent but forms no part of this reissue specification; matter printed in italics indicates the additions made by reissue.

With the advent of the so-called "computer revolution", many business organizations are now making day to day use of computer facilities of all kinds. For example, industrial and commercial corporations place most or all of their statistical data, including marketing information, inventory control, and the like, on computers. Payrolls are handled by computer, which involves numberless mathematical calculations. Engineering and technical data are handled by computers.

In other areas, such as in schools and colleges, libraries, and even in stock exchanges, for example, data and information of almost every conceivable kind are handled by computer. As the physical size of these computers progresses beyond the table or desk top size, such computers are able to perform larger and larger numbers of operations in progressively shorter times. However, even with the high electrical and mechanical efficiency characteristic of modern computers, these computers still generate considerable heat. Because of their operating characteristics, they require relatively high voltage, high-power input currents, and also involve the use of very high currents of lower voltage, usually direct currents (DC).

Because of the nature of the electrical and electronic components forming the major portions of these computers, a carefully controlled temperature and humidity environment is required. This in turn has given rise to the existence of the so-called "computer room" in large offices or like facilities. The usual computer room is a room or area which has been selected from among other rooms for adaption to the specialty requirements of computers, by being provided with heating, ventilating, and air conditioning ("HVAC") capacities suitable to its requirements, as well as being wired to provide high power AC and DC electrical service.

Customarily, because of these requirements, the actual computers themselves, as well as peripheral equipment (drives, printers, etc.), are placed on a false floor. Such false floors superficially resemble the conventional false ceiling, except that the false floors are able to withstand considerably more weight than can be carried or supported by a false ceiling. The false floor is placed in the computer room not only to support the computer itself, but also, and perhaps primarily, to provide a space beneath the computer work floor for installing and maintaining electrical wires and connectors which are used with the computer.

In many "computer rooms", air conditioning evaporators rest on the floor, discharging conditioned air directly into the room, while return air is taken from the room through a duct and register system disposed beneath the floor The present invention is compatible with these systems, but also provides design alternatives to these concepts, where desired. As the computers "grow" or are added to, with an increase in capacity or change of components, from time to time, there is the continuing need to alter the wiring and, in many cases, to alter the environmental control ducts or the like.

Thus, a proper computer room must not only include sufficient space for computers per se, their peripheral equipment such as tape or disk drives, and the like, but also for printers and other types of equipment having substantial mechanical components. The room must afford access to these machines by computer workers, who require an uncluttered floor space which can be used by them in computer operation and maintenance. Consequently, access to the electrical, mechanical, and other connections is usually gained through the floor.

Another major aspect of computer room construction planning relates to local fire and building codes. These fire and electrical codes commonly require the isolation of at least three different types of conductors, for obvious reasons. These include the provision of heating, ventilating, and air conditioning ducts which will insure that fresh air, return air, heating and cooling air, and the like are channeled into the room without being contaminated by unfiltered or uncontrolled sources of ventilation. It is essential that the air circulation system be reasonably well protected against penetration, inhalation and circulation of smoke, noxious gases or vapors, and the like, for the protection of the building occupants and the machinery as well.

For equally apparent reasons, codes require that high voltage wiring not only be insulated per se, but also be sheathed or protected within its own "wireway" or conduit and electrical ground system so that the wiring is not subject to mechanical damage in its normal working environment. In other words, insulated wire containing protective rubber and plastic insulation could still be the cause of fire or shock hazards if the protective coatings are pierced during conduct of operations not related to the computer.

Familiar examples include nailing into or through the protective coating from outside the wire, or piercing the insulating coating by means of saws, chisels, or the like. Rodents or the like also commonly gnaw away or otherwise compromise electrical insulation, raising the possibility of electrical shock and fire hazards. Consequently, electrical codes require secondary insulation of wires against mechanical penetration, usually requiring conductors to be placed within conduits. Naturally, as the computer grows, the requirements for isolating the power wiring, the central wiring and the environmental air become more complex and critical.

In addition, it is desired in many cases to isolate different kinds or types of electrical conductors from one another. In this way, the hazard of shock or the like is reduced and still further, radiation of stray magnetic or other electrical fields or discharges are avoided. A positive mechanical connection to a solid electrical ground is also required to reduce or eliminate the hazards of shock and buildup of excess static electricity.

Inasmuch a major expense in building construction, and particularly the finished installation of computers, is the positioning of the power cables and computer output cables from one another and from the environment as by the provision of bulky, stiff, and expensive and inconvenient conduit systems, it is an object of the invention to provide a combination computer support floor and wireway system which is able to provide a clean, uncluttered working area and support floor for the computer, together with a means of protectively isolating electrical cables of both high and low voltage from one another, while at the same time providing a simplified heating, ventilating and air conditioning duct system for environmental control of the room and the machines contained therein.

In view of the failure of the prior art to provide a system directed at a unified approach to computer installation and maintenance, it is a principal object of the invention to provide an improved computer support system, including a structure which provides a floor, which provides cable support, which provides one or plural protective plenums or passages for electrical connectors and the like and as well as environmental control ducts, together with a physically protective barrier for such cables and the like.

Another object of the invention is to provide a simplified floor structure which can be installed without unusually skilled labor and which is of modular construction for easy assembly, disassembly and maintenance.

Yet another object of the invention is to provide a modular system including a plurality of support columns, a plurality of brackets or holder units for floor panels, vertical divider or wall panels, and lower and intermediate floor or support panels, together with stringers or the like extending between pedestals for structural purposes as well as for wall and floor support.

A further object of the invention is to provide a system which utilizes simple modular components and which may easily be adjusted on the site without specially skilled labor.

A still further object of the invention is to provide a modular floor assembly and support system which also includes means for providing one or more intermediate or subdividing combination floors and protective assemblies for the above and other purposes.

Another object of the invention is to provide a modular structural system which is adapted for association with existing rooms and which greatly simplifies the wiring of computers or like units, which particularly simplifies maintenance and revision and repair of existing computer wiring or the like.

A further object of the invention is to provide a system which provides a plurality of mechanically isolated support structures on spaced apart vertical levels, but which also includes means defining vertically extending passages for conduits, or for circulated air or the like.

A still further object of the invention is to provide an improved mechanical support and isolation system for electrical conduits, which provides mechanical protection and also reduces heating and cooling problems associated with the conductors such as cables or the like.

Still further, it is an object of the invention to provide a system having a plurality of columns and vertically adjustable brackets positioned thereon, with the brackets being adapted to receive and position channel or other panel supports forming a part of both horizontal floor structures and vertically extending wall panel structures.

Another object of the invention is to provide a modular floor and sub-floor structure system which, by arrangement of wall, floor, and ceiling panels, provides vertical as well as horizontally extending passageways and provides the opportunity for a great variety of patterns as may be indicated by machine placement or other considerations of the designer, engineer or installer of the equipment.

Yet another object of the invention is to provide a modular system wherein a single column may receive a number of brackets and wherein a number of lateral support units extending between brackets serve plural purposes, particularly, the positioning of both wall and floor panels, with such support members also serving to subdivide both horizontal and vertical areas of the structure into separate floor areas, or, in some cases, individual passageways dedicated to separate purposes.

A further object of the invention is to provide a panel structure wherein access may be had to material otherwise contained in a protective conduit, simply by removing adjacent panels, and wherein an effective isolation or conduit structure may be changed without requiring metal bending or the like.

A still further object of the invention is to provide a composite floor support structure wherein electrical mechanical and HVAC codes may be met at the lowest possible cost and wherein electrical cables may be both accessible to be worked upon and yet protected against physical hazards lying or originating outside the wireway.

Another object is to provide a structure typically having an uppermost floor structure comprising a plurality modular panels extending between columns and being supported at their corners, a plurality of vertically spaced apart brackets each supporting plural panel support units, with a plurality of modular floor panels being positioned between selected columns and supported by the panel supports so as to provide both a lower floor structure and one or more intermediate floor structures, with each of the floor structures being subdivided by vertical walls and with one or more vertical passageways also being provided by suitably arranged wall panels extending between vertical levels in the areas from which floor panels are absent.

Still further, an object of the invention is to provide a work support floor structure wherein the floor itself may contain fire resistant, imperforate panels, apertured panels for providing ventilation into the area and apertured panels for permitting passage of electrical conductors therethrough, with all forms of panels being interchangeable and lying within the floor structure so as to facilitate maintenance or redesign of the floor unit.

A still further object of the invention is to provide a structure which will enable a computer or like machine to be installed or moved about or modified without violating codes and regulations, and at minimum cost.

The foregoing and other objects and advantages of the invention are achieved in practice by providing a combination support floor and conduit protection assembly which includes a plurality of columns, a plurality of brackets, and a plurality of wall and floor panels arranged on vertically spaced apart levels to define support floor areas for electrical conductors, isolated plenums for these conductors and for the passage of air, and wall panels arranged so as to provide vertically extending passages through which the air may flow and through which the conductors may extend between levels. The invention also achieves its objects by providing a method of supporting a computer and protectively isolating electrical conductors by modular construction of support and isolating elements.

The exact manner in which the foregoing and other objects and advantages of the invention are carried into practice will become more clearly apparent when reference is made to the following detailed description of the preferred embodiments of the invention set forth by way of example, and shown in the accompanying drawings, wherein like reference numbers indicate corresponding parts throughout.

BRIEF DESCRIPTION OF THE DRAWINGS

FIG. 4 is a top plan view, partly in section, with portions broken away, and showing the column, bracket and panel support of the invention;

FIG. 5 is a top plan view of the uppermost portions of the column of FIGS. 1-3 and showing a top support bracket in position of use;

FIG. 6 is a vertical sectional view of the bracket and panel support unit of FIG. 4, taken along lines 6—6 thereof, FIG. 7 is a vertical sectional view, taken along line 7—7 of FIG. 4 and showing another aspect of the column brackets and panel support assemblies of the invention;

FIG. 8 is a vertical sectional view, taken along line 8—8 of FIG. 5 and showing parts of the upper floor support assembly in section;

FIG. 9 is a vertical sectional view, taken along line 9—9 of FIG. 5 and showing additional details of the top panel support assembly;

FIG. 13 is a perspective view of a modified form of support structure made according to the invention;

FIG. 14 is an enlarged sectional view taken along lines 14—14 of FIG. 13, and showing a mechanical holddown/electrical ground system of positioning the floor panels atop the support bracket; and FIG. 15 is a perspective view showing the manner in which certain portions of the wall panel pivot between folded and extended positions to facilitate installation.

DESCRIPTION OF PREFERRED EMBODIMENTS OF THE INVENTION

While it will be understood that the concept of the invention is applicable to a number of installations, and that constructional details thereof may be varied, a description of a preferred form of the invention will be given wherein there are provided a top combination machine support and working floor extending horizontally above a building floor structure, a lower conductor support floor and passage, and an intermediate structure adapted to support another set of cables or like conductors within their own isolated passage. Accordingly, while the illustration shows uppermost, lowermost and intermediate support floors on a structure disposed above a building floor, it is within the scope of the invention to provide only a single intermediate floor and conduit assembly, or two or more of such intermediate floors forming parts of isolated passages.

Likewise, while a preferred form of floor and panel modual assembly has been described, it will be understood that, for reasons of manufacturing or assembly, certain variations may be made in the described forms of structure and that such changes will fall within the scope of the invention.

Figure 1:
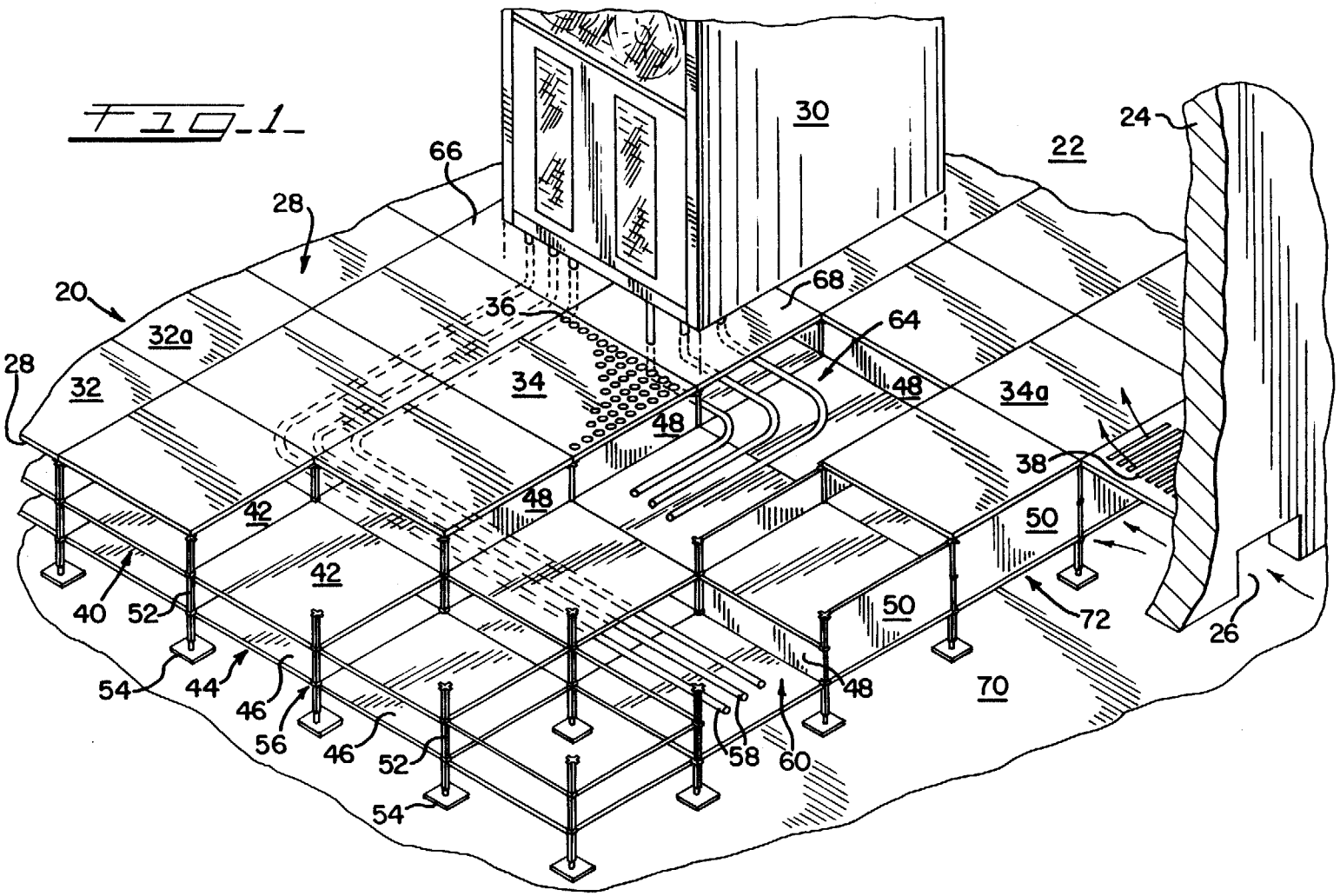
FIG. 1 is a perspective view, with portions broken away and with certain parts removed for purposes of illustration, showing the working area support floor and conduit protection assembly of the invention installed in position of use and providing a work area and computer floor support, protective isolation for conduits, and means defining ducts for the direction of conditioned air.

Referring now to the drawings in greater detail, FIG. 1 shows a modular support floor and conduit assembly embodying the invention, generally designated 20 and shows to be situated within a closed off room area 22, defined in part by vertically extending room walls 24 having on or more HVAC inlet openings 26, and that a working floor portion generally designated 28 is provided to support a computer 30.

According to the invention, the upper or work support floor generally designated 28 is comprised of a plurality of imperforate panels 32, 32a, etc., and one or more perforated panels 34, 34a. The panel 34 is shown to have a plurality of small round apertures 36, while the panel 34a is shown to have peripheral louvers or vents 38; some apertured panels are typically dedicated to "supply" air and others to "return" air the form shown.

The invention also is shown to comprise an intermediate conductor support floor generally designated 40 and shown to include a plurality of identical intermediate floor panels 42; similarly, a lower support floor unit generally designated 44 is shown to be comprised of a plurality of lower floor panels 46, which may be identical to the panels 42, for example.

Various vertically extending modular wall panels 48 are shown to be provided and to extend between the intermediate floor 40 and the work support floor 28, for example, and also to extend between the lower floor 44 and the intermediate floor 40. While FIG. 1 shows that a vertically extending panel, such as the panel 50 may be made to open two floor levels but be made in one piece, it is preferred, according to the invention, that all wall panels be single story or single height, such as the panels 40, for reasons of economy in producing and installing such wall panels.

The other principal assemblies of the invention include the columns 52, their associated floor and wall supports 54, and a series of corner bracket or stringer support assemblies generally designated 56 in FIG. 1 and which are described in detail elsewhere herein.

While detailed reference to the operation of the floor system of the invention is made elsewhere, it will be noted from FIG. 1, which is partially diagrammatic in character, that the arrangement of the vertically spaced apart floors and individual walls is such that a series of high voltage electrical conductors 58 may be arranged on the lower floor 44 and may extend through a plenum or isolated passage generally designated 60 which terminates beneath the computer; and that the intermediate floor 40 supports a plurality of conductors 62 which also extend from a source (not shown) through their own plenum or isolated passage 64 to a location beneath a portion of the computer, at which point they pass through apertured floor panels respectively designated 66, 68. As shown, by extending through their own plenums or isolated passages, the cables or like conductors 58, 62 are protected from mechanically overlying one another, and are also protected from the environment. The space between the building floor structure shown at 70 and the lower surface of the lower floor 44 also forms a plenum generally designated 72 for the passage of air, which may enter the room or be exhausted therefrom, through the grille work 38, or through the apertures 36 in the panel 34, for example.

For this purpose, it maybe assumed that, as shown by the arrows, the louvres 38 provide inlet air, whereas the openings or apertures 36 provide a return air path. According to the invention, it is not necessary that the path be arranged as illustrated, but only that mechanical isolation be provided between cables of different character, and that they be isolated from the heating, ventilating and air conditioning (HVAC) ducts for the reasons referred to herein.

Figure 2:
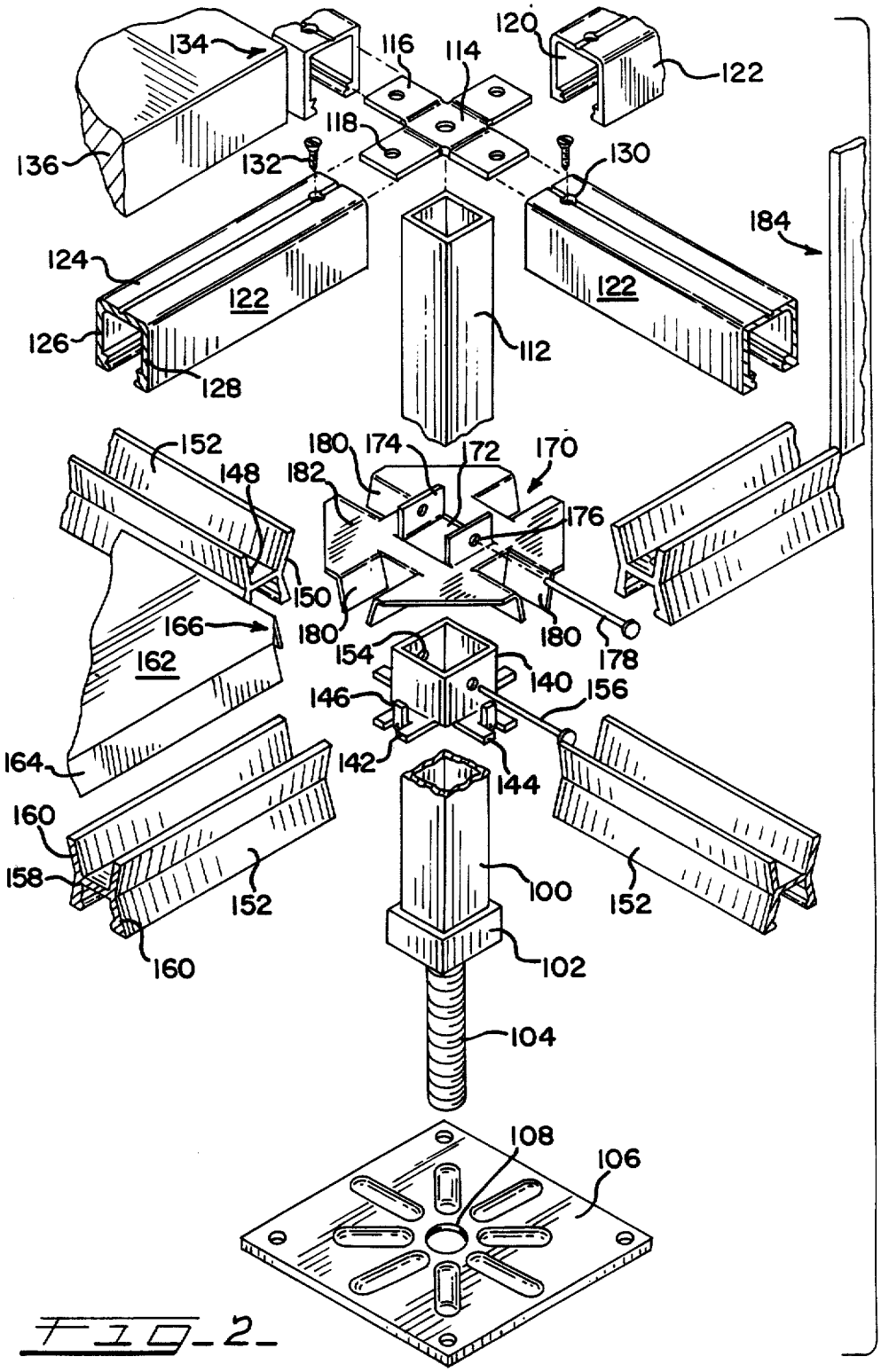
FIG. 2 is an exploded perspective view, with portions broken away, showing an adjustable height column of the invention, top brackets and intermediate bracket units, together with intermediate panel supports adapted to receive and position both floor and wall panels.

Referring now to FIG. 2, certain elements of the structure of the invention are shown in greater detail. Thus, referring in particular to FIGS. 2 and 3, selected mechanical parts of the invention are shown to include a vertically extending column 100, having a collar 102 at the bottom thereof and including a threaded column height adjustment stud 104 extending axially outwardly from the bottom of the column 100, with the stud 104 being adapted to be received within a holddown plate 106 having a threaded central opening 108 and a plurality of stiffening offsets or "dimples" 110 therein to increase the stiffness of the plate 106. The stud 104 providing the height adjustment feature may instead be provided at the upper end of the column 100, if desired. Alternatively, these parts may be positioned and welded in place at the factory.

Referring now to the upper end 112 of the column 100, there is shown to be a work support floor bracket 114 of cruciform shape and having four legs 116 extending outwardly therefrom, with each leg having a tapped fastener-receiving opening 118 therein. As shown, the legs 118 on the top bracket 114 are adapted to be received within an open end 120 of one of a plurality of floor panel supports or stringers 122, with each support 122 preferably being of inverted U-shaped cross-section and having a flat top surface portion 124 and opposed legs or flanges 126, 128 which may be extend vertically or may be inclined so as to have a taper, for example.

The end portion 120 of each panel support 122 has an opening 130 therein for receiving a fastener 132 adapted to be received in the opening 118 in the bracket 114. As will be apparent, when the top bracket 114 is positioned over the top of the top 112 of the column 100, and each panel support 122 is positioned so that the openings 130, 118 are in registry, the fastener 132 may be inserted to hold the structure. Thereafter, the corner portion 134 of a rigid floor panel is positioned, along with a number of its counterparts such as the panels 32, 32a, to form a complete floor (FIG. 1).

Figure 3:
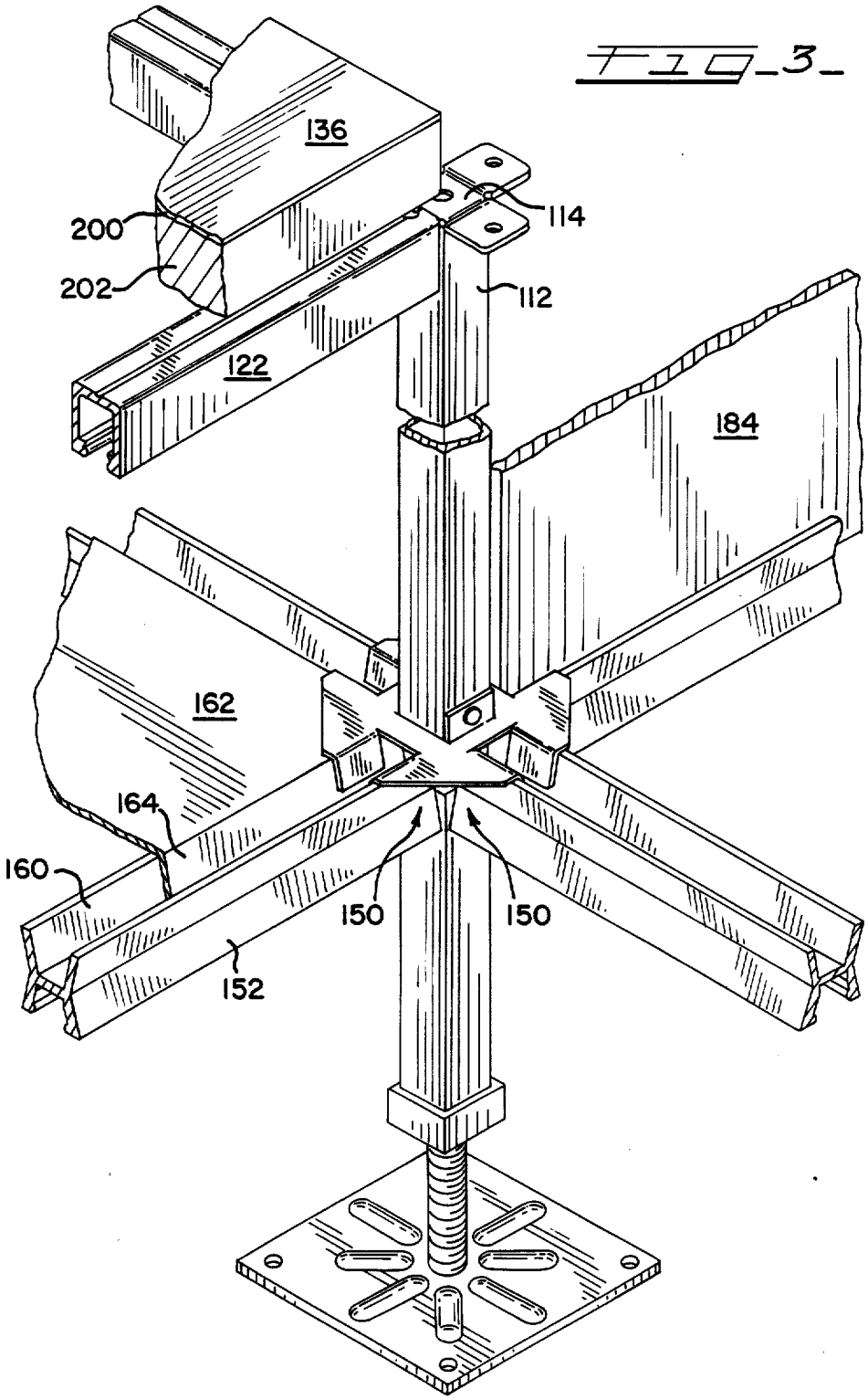
FIG. 3 is a perspective view of the support system of the invention, showing portions of a single intermediate floor and illustrating the unit in the assembled position thereof, with the floor panel being supported at the top and showing one lower or intermediate floor panel and one wall panel in their installed positions.

FIG. 3 shows the assembled form of the exploded elements in FIG. 2, with the panel 136 resting atop one of the supports 122 and with the top of the column 112 supporting the bracket 114.

Referring again in FIG. 2, the construction of the intermediate support bracket and its associated parts are shown. These parts include an intermediate support bracket 140 having a center section of square cross-section and adapted to be received over the exterior of the square column 100, and to include four substantially identical legs 142 extending outwardly therefrom. Each leg in turn includes a pair of stringer support fingers 144 flanking an upturned locator stud 146 disposed between them and adapted for reception in the opening 148 on the end portion 150 of the combination floor and wall support stringer 152. The intermediate bracket 140 also contains plural transversely extending openings 154 for reception of a positioning pin 156, for vertical location of the bracket 140. Referring to the floor and wall support stringers or channels 152, each of these substantially identical units will be seen to be of generally H-shaped cross-section, but preferably having, in addition to a center section 158, inclined legs 160 which facilitate the panel assembly process, as will appear.

Another element of the intermediate floor and wall system is the floor panel 162 having downwardly extending peripheral flanges 164 and a notched out corner portion 166. In the preferred form, the flanges 164 extending downwardly from the floor panel 162 have the same degree of taper as the inclined walls 160 of the channels 152. An additional important element of the floor and wall support unit is a panel clamp generally designated 170, and shown to include a central opening 172 through which the column 100 may extend, a pair of locating ears 174, each having an opening 176 therethrough for accommodating a positioning pin 178.

Each clamp also comprises four substantially identical, radially outwardly extending panel locks each comprising opposed, angularly downturned flanges 180 having a bevel or inclination generally parallel to that forming the flanges 160 on the supports 152 and the flanges 164 on the panels 162. The body of the clamp 170 is thus formed of a generally flat surface 182 with various parts of it being subdivided into four identical panel locking sections each having opposed margins from which downwardly extending flanges are formed, and having a central portion from which opposed upwardly extending flanges are formed. As is apparent, once the stringers or combination floor and wall support units are installed with respect to the bracket 140, the panels 162 are placed in the structure, and the clamp 170 is positioned and pinned in place to lock the panel units in their desired positions of assembly.

FIG. 2 also shows another element of the invention, namely, the wall panel 184, generally corresponding to the vertical wall panels 48 shown in FIG. 1. This panel is imperforate and, in use, it and its counterparts will lie within the upwardly directed opening formed between the flanges 160 and the center section 158 of the channel 152 and the legs or flanges 126, 128 of the top floor support 122.

As shown in FIG. 3, which shows the assembled form of the unit of FIG. 2, a floor is formed by the panels 162 whose margins 164 extend downwardly along the flanges 160 on the supports 152, with the inner ends 150 of the supports 152 lying adjacent the column 100 and being held in place by the locking system described. The wall panel 184 is positioned as shown in FIG. 3.

For purposes of illustration, FIGS. 2 and 3 show only one floor assembly lying beneath the upper floor, but it is understood that any number of bracket assemblies may be provided and that each would position the desired supports for the floor and wall panels just described.

Referring now to FIG. 4, certain assembly details of the unit are shown, with portions being broken away to illustrate the successive assembly, namely, that the bracket 140 surrounds the column 100 and is positioned by the pin 156, that the studs 146 extend through the openings 148 to position the channels 152, and that with the panels 162 in place, the clamp 170 provides security for the corner structure and prevents disassembly thereof, holding the floor panels in their desired positions of use. The clamp also serves the function of insuring that there is a relatively impermeable corner joint where the panels intersect the columns.

According to the invention, the brackets 140 and the clamp 170 may be positioned by openings previously drilled in the column 100, or such openings may be formed on the construction site. FIGS. 6 and 7 show the clamp member 170 being held by the pin 178 which also extends through the column 100 and through the openings 154. The clamping action afforded by the flange 180 of the clamp and their overlying relation to the panel flanges 164 is shown, as are the positions of the studs 146 formed in the bracket legs 142.

FIG. 5 shows the positioning of the top floor supports 122 in position of use with the fasteners 132 in place, and shows that the nested or interlocking relation of the square elements provides a secure corner.

FIGS. 8 and 9 show the sectional views of the support units 122 in position over the upper portion 112 of the column 100.

Figure 10:
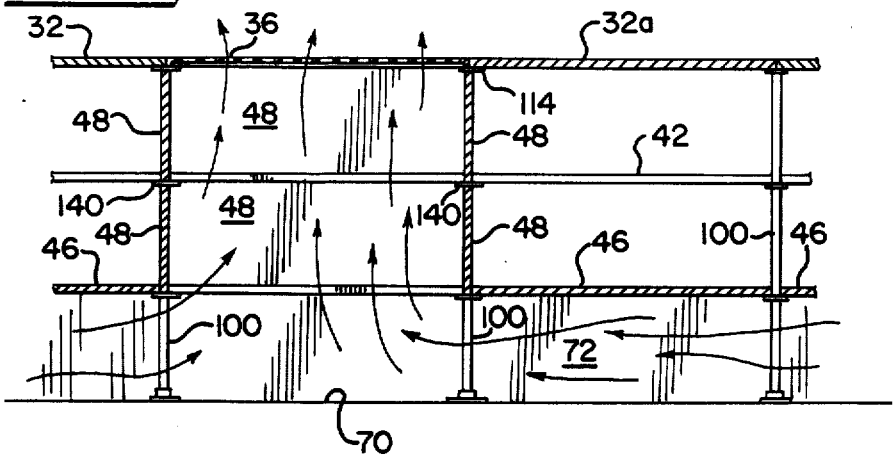
FIG. 10 is a vertical sectional view, partly diagrammatic in character, showing the arrangement of an air passage including a vertically extending passage for conditioned air.

Referring now to FIG. 10, there is shown the provision of a plurality of columns 100 supporting brackets 140 which form the intermediate support columns and top brackets 114 for the floor panels 32, 32a. A perforated or louvred top panel having openings 36 therein for discharge of air is shown as forming an air outlet into the room above the floor. In addition, there are imperforate lower floor panels 46 in place, positioned by the columns 100, said panels being arranged next to each other except for a void space or opening partially defining the isolated passage which is defined by the building structure floor 70, and a plurality of vertically extending panels 48 which form the side walls of the vertically extending air floor passage.

Thus, an isolated plenum 72 is formed for the passage of air, with such plenum including both horizontally and vertically extending sections formed by a combination of floor and wall panels. It will be understood that air flow may be outwardly from the openings 36, or that in such arrangement, air flow may be reversed and the duct could serve as a return air duct. Importantly, both supply and return air may be provided in the same arrangement, merely by positioning the floor panels 46 or 42, for example and appropriately positioning the wall panels 48 and selected floor panels.

Figure 11:
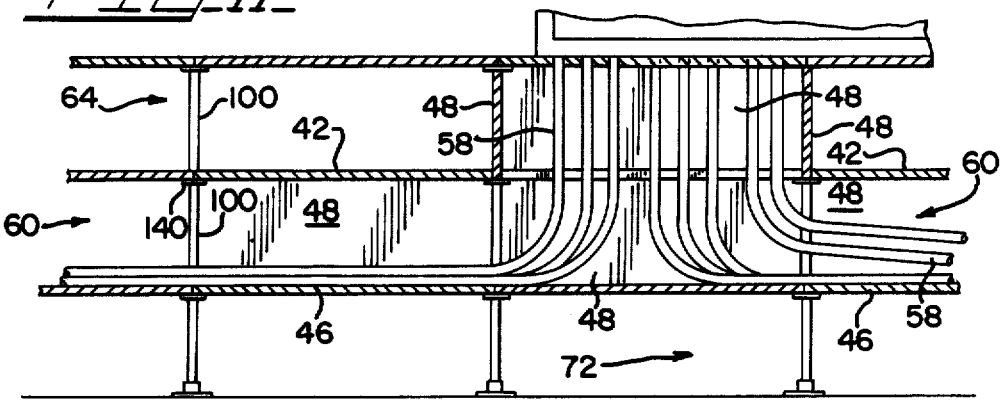
FIG. 11 is a vertical sectional view, partly diagrammatic in character, and showing the arrangement of horizontally and vertically extending protectively isolated passages for electrical cables serving a computer held on the main support floor.

FIG. 11 shows a similar arrangement with the plural columns 100 and their associated brackets 140 supporting the lower floor panels 46, with various vertical wall panels 48 being present to form a plenum generally designated 60 for the passage of these cables. This plenum lies between the lower floor panels 46 and is also defined by intermediate floor panels 42 where it extend horizontally and by the vertical wall panels 48 where these are provided, such panels 48 serving both as the side walls for the horizontally and vertically extending portions of the plenum or passage 60. The conductor cables 58 are shown to be physicallyl supported by the floor 46 in keeping with code requirements; they are also isolated from other conductive cables as has been pointed out. FIG. 11 illustrates that other plenums, schematically designed 64 and 72, are present in the same structure but do not form a plenum which communicates with the plenum 60, and in fact is isolated therefrom according to the invention.

Figure 12:
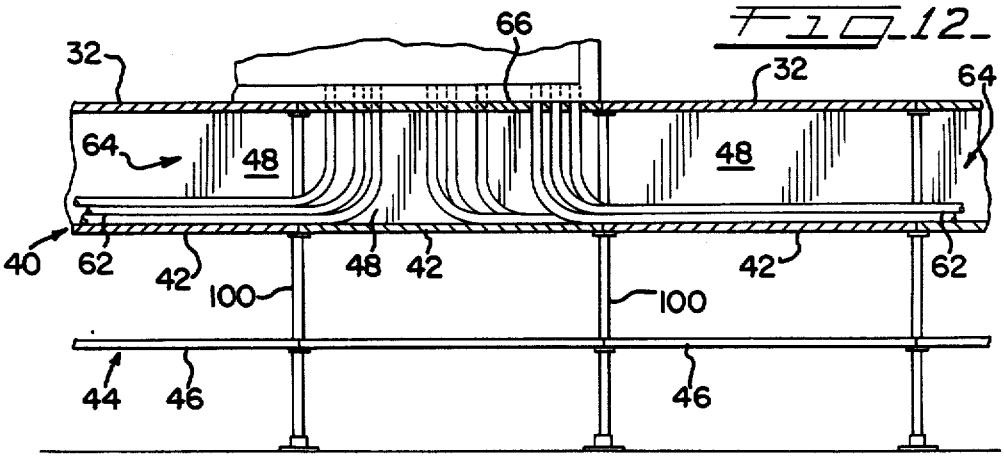
FIG. 12 is a vertical sectional view, partly diagrammatic in character, and showing the arrangement of horizontal and vertical passages and floor support for other electrical cables extending through horizontal and vertical passages in the flooring system of the invention.

FIG. 12 shows the arrangement of plenum generally designated 64 for conductors 62, which are shown as entering from both sides of the arrangement and are shown as being supported on the plural floor panels 42 forming the floor assembly 44. Vertically extending wall panels 48 define the portions of this plenum not defined by the floor and the undersides of the floor panels 32. The panel 66 which forms a part of the floor unit contains apertures schematically shown to permit passage of the cables therethrough so that the plenum 64 has an outlet for these cables. The lower floor elements again provide plenums which are isolated from the plenums just referred to, in keeping with the invention.

Referring now to the additional construction details, and in particular to FIGS. 2 and 3 through 9, the floor panels 136 may include a sheet metal clad layer 200 and a central core 202, of a particle board for example, and may be covered with carpeting (not shown) if this is desired. The parts may also have a lightweight concrete core, or use another type of filler. A modular floor construction is preferred, but is not absolutely necessary in keeping with the invention. The vertical column 100 is preferably made from a structural grade steel, with the wall and floor supports 122, 152 preferably being made from aluminum extrusions or formed steel elements.

The brackets 114, 140 and the clamp units 170 as well as the pins 156, 178 are preferably made from steel although other materials may be suitable. The floor panels 162 and wall panels 184 are preferably made from steel or other rugged material providing resistance to rodents, and providing a substantially imperforate surface in respect to circulating air and the like. Inasmuch as codes usually require metal-to-metal electrical grounding, most or all parts preferably contain a corrosion-resistant coating such as galvanizing or the like. The various panels illustrated may include gasket material of a conventional type such as foam or adhesively backed tape if a tighter air seal is desired. Rubber or other treated materials may be used for sound or vibration insulation if this consideration is important. The wall panels 84 may be single sheets as shown, or may be jointed or hinged along their horizontal centerline, for example, as will appear in connection with a description of FIG. 15. Various pins, screws, and the like have been shown as preferred fasteners, it being understood that the various columns and brackets may be predrilled for this purpose, or may be assembled by drilling on the construction site. They may also be welded, soldered or brazed as appropriate. The adjusting screws, such as the stud 104 and the like, may be provided for a height adjustment or for leveling in a conventional manner, and adjustment may be provided at the top or bottom of the columns, or both, if desired.

Referring now to FIGS. 13–15, an alternate form of apparatus embodying the invention is shown. In FIGS. 13–15, there are illustrated forms of construction which are preferred for meeting certain codes, and which may be desired or required in some applications, or which are preferred for ease of manufacture, or the like.

While the construction shown in FIGS. 13–15 is generally similar to that shown in FIGS. 2–9, for example, the floor support apparatus generally designated 200 in FIG. 13 is shown to include a column such as the column 202 having a lower portion 204 supported on a footing or plate 206 which may include stiffening "dimples" 208 or the like thereon, as well as holes or slots 210 to facilitate bolting to the floor or the like. The column 202 includes a tapped collar 212 at its upper end which serves to locate a threaded top extension 214 which terminates in a floor tile locating plate 216 affixed to the top thereof. This floor tile locating plate is adapted for vertical positioning by manipulation of the screw threads 214, and is thereafter intended to fixedly position floor tiles such as the tiles 218 shown received thereover. The tiles 218 have edge portions 220 which are adapted to engage an upwardly turned alignment tab 222 on the plate 216.

As shown, the core of the floor panel 218 is made from a lightweight concrete material 224 surrounded by an exterior skin 226 of sheet metal or the like. Inasmuch as some codes require grounding for electrical safety, means to be described herein are provided for insuring continuous electrical conductivity across the surface of the floor tiles and on to a suitable ground.

Referring again to the plate 216, it will also be seen to include a number of vertically extending contoured locator pins 228 each having a enlarged head portion 230 and a shank 232 which is affixed to the plate 216. Referring again to FIG. 13, it will be noted that a plurality of stringers generally designated 240 are shown to be provided and to extend in all four directions from a center portion 242 of the column 202, being situated by bracket assemblies generally designated 244. While the constructional features of the bracket and stringer arrangement is similar to that shown in the earlier figures, certain constructional differences appear, and these are provided for ease of manufacturing or the like. Thus, each stringer 240 is shown to include an upper section 246 and a lower section 248 of identical, contoured cross-section, preferably being made from an aluminum alloy or a rolled steel construction. As shown at 250, these channels may have their bight portions 252, 254 spot welded together as at 250 at spaced apart points along their length to provide a composite channel of generally H shaped cross-section, but contoured so as to have sloping sidewalls to facilitate entry of the vertical wall portions it is intended to receive.

Referring to other differences and similarities to the construction shown in FIGS. 2–9, it will be noted in FIG. 13 that a means in the form of individual panels 256 are provided to establish conductor support floors, and that these panels have notched out corner areas 258 where they meet the center section 242 of the columns 202. At these column corner areas, the brackets 244 have cruciform sections in plan view and include a plurality of outwardly extending legs 260, 262, which enter the open ends of the channels, and engage the under surfaces of the bight portions 254 so as to locate the channel or stringer against vertical displacement and properly align it with the column 202.

Inasmuch as some electrical codes require the wireways formed by the floor panels 256 and stringers 246 to be free from sharp or upturned edges, a contoured floor panel holddown unit 264 is provided and shown to include a set screw 266 adapted to hold the unit 264 in place. Because of the cross-sectional shape of the stringers 246, the holddown 264 has a generally keystone or trapezoidal shape when viewed in end section. These elements replace their counterpart bracket and clamp assemblies shown in FIGS. 2–9, but serve the same functional purpose.

Referring now to other different features of construction, the vertical walls generally designated 270 are shown to include an innermost, fixed vertical wall section 272 and an outermost, folding partition wall section generally designated 274. The wall panel such as a panel 272 has an axial extent corresponding in length to that of the holddown 264, and extends between the top surface 276 of the holddown 264 for example, and the downwardly directed opening in the lower portion 248 of the channel disposed thereabove.

The inner wall element 272 terminates along a vertical end surface 278, and in use, this surface 278 abuts the counterpart end surface 280 of a folding vertical partition wall 274.

Referring now to FIG. 15, such a hinged partition wall is shown to be divided into upper and lower parts respectively designated 282, 284, each of which includes an outer contoured stiffener section 286 having an enlarged width foot 288 and a pair of spaced apart sidewalls 290, 292 which embrace therebetween a margin 294 of the panel proper 296. Along the lower margin 298 of the panel 296 is the female portion 300 of a hinge assembly generally designated 302 and shown to be formed by an enlarged contoured cylindrical end 304 in the upper margin 306 of the lower wall 284. In the manner of a piano hinge or like continuous hinge, the two cooperating sections 304, 300 provide a flexible, folding movement through approximately an 80° to 90° arc for these parts. A stiffener generally designated 308 for the lower section 306 includes sidewalls 310, 312 embracing the margin 314 of the main panel. A foot portion 316 or the like defines the lower end of the panel and is adapted for reception in the channel 320, for example.

As will be appreciated, a vertically extending wall may be formed simply by folding one such wall-forming assembly about its horizontal centerline, positioning it between adjacent stringers and pivoting the two wall sections about their central pivot point as the feet portion 288, 316 are moved into appropriate openings in the channels such as the channels 246, 320, for example. Merely pivoting the hinge into an open position locks the panels in place and provides an appropriate vertical wall. Referring again to the column 202, various formed sections may also be provided to insure tight joints in this area, it only being necessary that means be provided on the column for removably positioning the stringers which in turn support floor panels or the like.

Referring now to FIG. 14, an enlarged vertical sectional view of the fastener for the floor tiles is shown. In this area, a hat section generally designated 330 is provided and includes an exterior shell 332 receiving a captive coil spring 334 therein. The radial flange 336 of the hat section is mechanically attached, as by crimping or spot welding, to the lower metal surface 338 of the panel.

Consequently, when assembling the floor tiles 218, it is only necessary to position a corner of the tile, such as the floor tile 218, in registry with the opening generally designated 340 therein and in overlying relation to the pin unit 228, following which pushing down on the tile serves to create an electrical and mechanical contact, with the head portion 230 being snugly received within the coil spring 334 and the fitting 332. Accordingly, a good electrical ground is provided in this area, as may be required by some codes.

The exact constructional details of the bracket and wall and floor support panels may be further varied and still fall within the scope of the present invention. However, preferred forms thereof have been illustrated which provide relatively exact location, ease of asembly, interchangeability of parts in keeping with modular construction and simplicity of assembly. Safety and security have not been compromised, however, as many as the materials are rugged and self-supporting, and when erected are extremely rigid, with the strength necessary to support a computer or other heavy floor load as well as having the rigidity necessary to support the dead load of cables or the like and to provide the required mechanical isolation.

Referring again to FIG. 14, it will be understood that, in lieu of using a mounting system having a fixed locator pin on the column structure and a spring connection forming a part of the panel, it is possible, and in some cases preferred, to provide the panel with a socket for a threaded fastener and a secure an exterior spring to the panel by means of the fastener so that the spring making contact with the column for rounding purposes extends outside of the panel instead of lying within it.

Where, as in the embodiment of FIG. 13, the floor panels are rigid, channels or stringers may not be required to support the panels. In such cases, a nonload-bearing panel may be provided beneath the floor panel merely for locating the vertical sidewall panels.

The panels 218 are shown as having a metal exterior with a concrete core, but it will be understood that any floor panel meeting a proper code will be acceptable.

Referring now to the assembly of a typical modular floor support and conduit protection assembly, the preferred sequence involves, following measurement and layout, placing the columns in their desired locations and fitting the lowermost set of support brackets over the columns, locating them as desired at a level height.

Thereafter, the lowermost floor portion is constructed by installation of appropriate panels, leaving open spaces where vertical ducting is indicated. After the floor panels have been inserted, the clamps are positioned and locked in place. At this point, a rigid structure consisting of vertical columns and floor panels which is self-sustaining has been produced. Next, vertical walls and the next level of brackets are positioned, with the vertical walls being held by installation of the channels or like supports 152 placed over them and locked in place by cooperation of the lugs 146 and the openings 148.

Then, the second level of flooring is installed, leaving appropriate openings where desired, and the floor panels are again clamped in position as indicated. If no more floor panels are planned, then the vertical or side wall panels are held in position and the top brackets 114 placed over the tops of the columns following which the walls are positioned by positioning within the downwardly directed recesses in the top supports 122, which are then fastened by screws 132 with the brackets 114. At this point, the isolated passages or separate plenums have been established and the top floor panels are then installed as desired, with apertured panels being placed where indicated.

During construction, after any one floor is positioned, cables may be "pulled" into the appropriate position prior to the next construction phase. Thereafter, all necessary cables are pulled to and through floor level for installation on the appropriate machines. For working purposes, various floor panels may be temporarily removed and replaced after wiring or other physical "hook-up" is complete. The invention has been illustrated with relation to electrical connectors, but it is understood that water cooling, plumbing, or other lines or conductors of various kinds may also be supported by the floors of the invention, or may be supported by the building floor lying beneath the plural spaced apart conduit support floors positioned by the columns of the modular structure.

Whereas the invention has been described as preferably comprising a series of superimposed floors with vertical walls defining passages extending vertically through the areas above such floors, it will be understood that, in some cases, floor areas need only be provided beneath areas on which electrical or other conductors will be positioned, and that effective conduits for these conductors may be made by a combination of floor panels underneath them, with wall panels along the other side of the floored-in areas thus defined. Hence, the lower or intermediate floors need not be fully coextensive with each other or with the uppermost or work support floor.

A very important feature of the invention is that, with the need for large diameter conduit being obviatged, and with the need for electrical workmen installing and bending such conduit being eliminated, the construction of the computer room may be done in a single operation, with building progress not being required to be stopped between the time that the carpentry or floor construction portion of the installation is made and the electrical installation begun. In the past, it was sometimes necessary to build a portion of the computer support floor, then await completion of intermediate electrical work by electricians, following which the mechanical work on the floor could be completed. According to the present invention, the need for such step-by-step construction is avoided.

It will thus be seen that the present invention provides a modular floor support and conduit protector assembly having a number of advantages and characteristics, including those pointed out herein and others which are inherent in the invention. Preferred embodiments of the invention have been set forth by way of example, it is anticipated that certain variations and changes may be made to described structure without departing from the spirit of the invention or the scope of the appended claims.

I claim:

1. A combination working area floor structure and conductor support and isolator assembly comprising, in combination, a plurality of vertically extending floor support column units each having upper and lower end portions and an intermediate column section, a working area floor positioned by and disposed in overlying relation to said upper ends of said column support units; means on at least one intermediate portion of said support columns for positioning and supporting at least one conductor support floor, said conductor support floor being disposed beneath and spaced apart from said working area floor, a plurality of vertically extending imperforate wall panels extending between portions of said conductor support floor and said working area floor so as to subdivide the region above said conductor support floor and below said working area floor into a mechanically isolated conductor plenum adapted to receive and support insulated electrical conductors, and to afford mechanical isolation therefor, said plenum also including at least one upwardly extending opening in said working area floor through which said conductors may pass for attachment to an apparatus supported on said working area floor, with said wall panels also defining a mechanically isolated, vertically extending passage extending from beneath said conductor support floor through said isolated plenum and to said working area floor, with an under portion of said working area floor lying above said vertically extending passage and said conductor support floor also including at least one opening therein to afford communication between the area above said working area floor and the area beneath said conductor support floor.

2. A combination floor structure as defined in claim 1 wherein said at least one conductor support floor comprises at least two conductor support floors.

3. A combination assembly as defined in claim 1 wherein said at least one conductor support floors, with said vertically extending imperforate wall panels comprising a plurality of wall panel groups, add with at least one wall panel group being arranged so as to extend between said first conductor support floor and said working area floor, and with another of said wall panel groups being extending between said second conductor support floor and said first conductor support floor, and to further extend between said first conductor support floor and said working area floor, thereby subdividing said area between said first and second conductor support floors into another isolated conductor plenum, with said working area floor and said first and second conductor support floors further including sufficient openings therein to the permit the passages defined by said wall panel groups to extend between the region above said floor into said one conductor plenum, said other conductor plenum, and said region beneath said second conductor support floor, respectively.

4. A combination floor structure as defined in claim 1 wherein at least one of said vertically extending passages extending from beneath said conductor support floor to said working area floor is adapted for the circulation of air which is isolated by both said vertical wall panels and said floor panels from a plenum defined at least in part by said conductor support floor.

5. A combination work area support floor and conduit protection assembly, said asembly comprising, in combination, a plurality of spaced apart, vertically extending support columns having their lower end portions adapted to be supportingly received on a building floor structure, with each of said columns also including an uppermost bracket for receiving and positioning at least portions of working floor panels, a lower floor support bracket adapted to engage and support at least portions of a lower floor forming panels and at least one intermediate floor support bracket being adapted to engage and support portions of intermediate floor-forming panels, said work area support floor comprising a plurality of imperforate panels extending between and supported by said brackets on said individual columns, with at least some of said working area floor panels being apertured so as to provide a path of communication between the area above said working area floor and the area beneath said working area floor, a plurality of panels extending between said brackets so as to form an intermediate floor structure, and an additional plurality of panels extending between said brackets so as to form a lower support floor, with a plurality of vertically extending wall panels extending between said working area floor and at least one each of said intermediate and lower floors so as to provide at least one vertical passage extending through and being mechanically isolated from the plenum formed between said intermediate floor and said working floor area, and the plenum between said working area floor and said lowermost support floor to provide passages from the area beneath said lower floor to the area above said working area floor, thereby providing plural plenums for supporting electrical conductors or the like, and for permitting the passage of ventilating air, all of said plenums being separated from one another by imperforate panels and each providing access to itself from an area outside said structure on the one hand and to the area above said work area support floor on the other hand.

6. A modular three-dimensional support structure adapted to be positioned atop and be supported by a building floor, said structure including a working floor adapted to support a machine or the like, at least first and second sub-floors disposed in underlying relation to said work floor and being vertically spaced apart from each other and spaced upwardly apar from said building floor structure, said structure comprising a grid system including a plurality of spaced apart, vertically extending columns arranged in a regular pattern along two mutually perpendicular horizontal axes, a plurality of brackets disposed on each of said columns, said plurality comprising a plurality of upper brackets being affixed to the respective upper ends of said columns, said upper brackets lying in a first plane and being connected to one another by working floor support stringers, a plurality of first sub-floor brackets disposed respectively on said individual columns and lying in a single plane parallel to the plane of said working floor, with said brackets having attached thereto a plurality of first sub-floor support stringers of channel-shaped cross-section, and a plurality of second sub-floor brackets each associated with one of said columns and being arranged in coplanar relation with one another and lying in a plane spaced vertically apart from the plane of said work floor and first sub-floor, with said second sub-floor brackets having attached thereto a plurality of second sub-floor support stringers of channel-shaped cross-section, a plurality of floor panels associated with said upper brackets to form a working floor area, said plurality of working floor panels including imperforate panels and panels permitting passage of air and of electrical conductors therethrough, a plurality of first and second sub-floor panels received in said stringers and forming first and second sub-floors, and a plurality of vertically extending wall panels extending between vertically spaced panel supports so as to form vertical walls within said structure and so as to define, in part, plural isolated passages lying beneath said work floor, with portions of said passages being adapted to permit electrical conductors to pass therethrough and other portions being adapted to direct air therethrough for ventilation.

7. A method of protectively encasing electrical conductors and providing a conditioned air duct system for an enclosed environment which includes a building floor structure, said method comprising erecting a plurality of columns, disposing said columns in regularly spaced apart relation along given lateral and longitudinal axes, affixing said columns to one another by erecting a plurality of stringers extending horizontally between adjacent columns to define a three dimensional grid pattern including a plurality of panel-receiving frame units, said frame units being arranged in coplanar groups on spaced apart levels lying parallel to said building floor, and one of said levels being an uppermost, work area floor level and the other levels being spaced therebelow, disposing flooring panels, in said frame units, said flooring panels being both imperforate panels and apertured panels for said work floor and being imperforate panels for said other levels, and disposing vertically extending imperforate wall panels in said frame units thereof, so that said floor and wall panel units combine to define plural passages isolated from one another and individually dedicated exclusively to conditioned air passages and electrical conductor passages respectively, with said passages including upper openings extending through said work floor to permit passage between said area above said work floor and the area comprising said isolated passages, whereby said system may provide a load support and work area floor, and a plurality of mechanically isolated conductors passages and conditioned air passages, respectively providing access to the interior of a room defined in part by said building floor.

*8. An apparatus for use within a building structure to provide a working area floor and to subdivide the space beneath said working area floor into separate spaces, said apparatus comprising, in combination, a plurality of vertically extending floor support column units each having upper and lower end portions and an intermediate column section, a working area floor positioned by and disposed adjacent said upper end of said support column units, means on said intermediate sections of said support column units for positioning and supporting a conductor support floor, a conductor support floor positioned by said positioning and supporting means in downwardly spaced apart relation to said working area floor, wall means extending generally vertically between portions of said conductor support floor and said working area floor and cooperating with portions of said conductor support floor and working area floor to define the interior of a first space in the form of a mechanically isolated wireway adapted to receive and support electrical conductors, said working area floor also including means providing access to the interior of said wireway from the area above said working area floor, with said conductor support floor, said wall means and at least a portion of said building structure cooperating to define a second space beneath said work area floor, said second space being mechanically isolated from said wireway.*

*9. An apparatus as defined in claim 8 wherein said portions of said conductor support floor from which said wall means extend vertically to said working area floor are portions defining at least one opening in said conductor support floor, and wherein means are provided in the portions of said working area floor disposed above said opening in said conductor support floor to permit access to said second space from the area above said working area floor.*

*10. An apparatus as defined in claim 8 wherein said wall means includes means in the form of at least one outer peripheral wall extending between an outer peripheral portion of said conductor support floor and portions of said working area floor disposed thereabove, wherein said conductor support floor includes portions defining at least one opening therein, wherein said working area floor includes portions disposed above said portions of said conductor support floor defining said at least one opening in said conductor support floor, said wall means further including wall means extending between said portions of said conductor support floor defining said opening and said portions of said work area floor disposed thereabove, said portions of said working area floor disposed above said portions defining said opening in said conductor support floor thereby defining at least one opening through which access to said second space may be had from the area above said working area floor.*

*11. An apparatus as defined in claim 10 wherein said opening in said working area floor is covered by a panel permitting ready air flow therethrough.*

*12. An apparatus as defined in claim 8 wherein said working area floor comprises a plurality of readily removable individual working area floor panels, each of said panels having four corner portions, with each of said support column units including a support bracket disposed at its upper end, and with at least some of said support brackets in use supporting corners of four different working area floor panels.*

*13. An apparatus as defined in claim 8 wherein said conductor support floor includes an outer peripheral portion, and wherein said wall means extending generally vertically between portions of said conductor floor and said working area floor comprises a wall disposed adjacent said outer peripheral portion of said conductor support floor so as to define the boundaries of said wireway.*

*14. An apparatus for use within a building structure to provide a working area floor and to subdivide the space beneath said working area floor into three separate spaces, said apparatus comprising, in combination, a plurality of vertically extending floor support column units each having upper and lower end portions and an intermediate column section, a working area floor positioned by and disposed adjacent said upper ends of said support column units, first and second, spaced apart means on said intermediate sections of said support column units for positioning and supporting respectively upper and lower conductor support floors, an upper conductor support floor disposed beneath and spaced apart from said working area floor and a lower conductor support floor disposed beneath and spaced apart from said upper conductor support floor, wall means extending generally vertically between vertically aligned portions of said upper and lower conductor support floors and between said upper conductor support floor and said working area floor and cooperating with said upper and lower conductor support floors and said working area floor to define the interiors, respectively, of upper and lower, mechanically isolated wireways each adapted to receive and support insulated electrical conductors, said working area floor also including means providing access to the interior of said upper wireway, means permitting an electrical conductor disposed within said lower wireway to pass from the interior of said lower wireway through said upper conductor support floor, through said upper wireway and through said working area floor, with said lower conductor support floor, said wall means and at least a portion of said building structure cooperating to define a third space which is isolated from said upper and lower wireways and lies beneath said working area floor.*

*15. An apparatus as defined in claim 14 wherein said portions of said conductor support floors from which said wall means extend vertically to said working area floor are portions defining openings in said conductor support floors,*

*and wherein means are provided in the portions of said working area floor disposed above said openings in said conductor support floors to permit access to said third space from the area above said working area floor.*

*16. An apparatus as defined in claim 14 wherein said wall means extending generally vertically between portions of said conductor support floors and said working area floor includes first means in the form of at least one peripheral wall extending between the respective peripheries of said conductor support floors and between one of said support floors said working area floor, wherein said conductor support floors include portions defining openings therein, wherein said working area floor includes a portion disposed above said openings in said conductor support floors, in which said apparatus further includes second wall means extending between said floor portions defining said openings and said floor portions disposed thereabove, and wherein means is provided in said portions of said working area floor disposed above said openings in said conductor support floor to permit access to said third space from the area above said working area floor.*

*17. An apparatus as defined in claim 14 wherein said means for positioning and supporting said upper conductor support floor includes brackets affixed to said support columns, and in which said upper conductor support floor comprises a plurality of readily removable floor panels positioned by said brackets.*

*18. An apparatus as defined in claim 14 wherein said means for positioning and supporting said upper conductor support floor includes brackets affixed to said columns, and wherein said apparatus further includes stringers extending between said brackets on said support column units, with said upper conductor support floor comprising a plurality of readily removable floor panels, each of said panels being supported at least in part by said stringers extending between said brackets.*

*19. An apparatus as defined in claim 14 in which said lower conductor support floor comprises a plurality of individual panels, and in which said second positioning and supporting means includes brackets positioning the corners of said panels, and in which said apparatus further includes means overlying said panel corners and said brackets to retain said panels against upward movement.*

*20. An apparatus as defined in claim 14 wherein said upper conductor support floor is made from a plurality of individual panels, and wherein said means permitting an electrical conductor disposed within said lower wireway to pass from the interior of said lower wireway includes an opening in one of said individual panels.*

*21. An apparatus as defined in claim 14 wherein said vertically aligned portions of said conductor support floors comprises the respective peripheries of said conductor support floors.*

*22. A combination working area floor and electrical conductor support and protection assembly, for use in a building structure, said assembly comprising, in combination, a plurality of spaced apart, vertically extending support columns having their lower end portions adapted to be supportingly received on a building floor structure, with each of said support columns also including an upper end with a bracket thereon for receiving and positioning at least portions of working area floor panels, and an intermediate portion with support brackets thereon for engaging and supporting at least portions respectively of panels for forming upper and lower conductor support floors, said working area floor including a plurality of imperforate panels extending between and being supported by said working area floor support brackets on said support columns, at least one of said working area floor panels being apertured so as to provide a path of communication between the area above said working area floor and the area beneath said working area floor, a plurality of panels extending between said upper conductor support floor brackets so as to form an upper conductor support floor structure, and an additional plurality of panels extending between said lower conductor support floor brackets so as to form a lower conductor support floor, said assembly also including a first group of vertically arranged wall panels extending between portions of said working area floor and portions of the periphery of said upper conductor support floor, and a second group of vertically arranged wall panels extending between portions of said upper conductor support floor and the periphery of said lower conductor support floor, said groups of panels, said working area floor said upper and lower conductor support floors and portions of said building structure cooperating to define, respectively, mechanically isolated upper and lower wireways and a conditioned air space, said working area floor including means providing access to the interior of said upper wireway, with said assembly also including means permitting an electrical conductor disposed within said lower wireway to pass from the interior of said lower wireway through at least one of said upper conductor support floor panels, through said upper wireway and through said working area floor.*

*23. An assembly as defined in claim 22 which further includes means defining the walls of a vertical passage extending from beneath said lower conductor support floor through said lower and upper wireways, said passage having portions in registry with said apertured working area floor panel.*

*24. A method of protectively encasing electrical conductors and providing portions of a conditioned air circulation system for an enclosed environment which includes a building floor structure, said method comprising a erecting a plurality of columns, disposing said columns in regularly spaced apart relation along given lateral and longitudinal axes, disposing a plurality of floor panels in a coplanar group adjacent the upper ends of said columns to form a first floor level spaced from said building floor and lying generally parallel thereto, disposing a plurality of conductor support floor panels in a coplanar group to form a second, conductor support floor lying between said first floor and said building floor, erecting an imperforate wall which extends vertically from the outer periphery of said conductor support floor to the portions of said first floor lying thereabove so as to enclose the space therebetween to form a mechanically isolated wireway, providing at least one opening in said first floor to provide access to the interior of said wireway from the area above said first floor.*

*25. For use within a building having walls and a base floor means, apparatus to provide a working area floor above said base floor means and to subdivide the space between said working area floor means and said base floor means into separate spaces; said apparatus comprising the combination of:*

*floor support means each having a plurality of floor mounting means including a working area floor mounting means and a conductor support floor mounting means disposed below said working area floor mounting means;*

*working area floor means mounted on said working area floor mounting means and spaced above said base floor means;*

*conductor support floor means mounted on said conductor support floor mounting means and spaced below*

*said working area floor means and above said base floor means;*

*and wall means, including said building walls, extending between said working area floor means and said conductor support floor means therebelow to define between them an interior space adapted to serve as a mechanically isolated wireway for receiving electrical conductors, and also extending between said conductor support floor means and said base floor means therebelow to define a second interior space beneath said working floor means which is mechanically isolated from said wireway;*

*said working area floor means including means providing access to the interior of said wireway from above said working area floor means.*

*26. An apparatus as defined in claim 25 wherein said working area floor means comprises a plurality of individual panels defining said working area floor, said individual panels being readily removable so as to provide access to said wireway.*

* * * * *